Jan. 2, 1968    M. H. BECKMAN    3,360,898
CONCRETE WELD PLATE
Filed Nov. 8, 1965
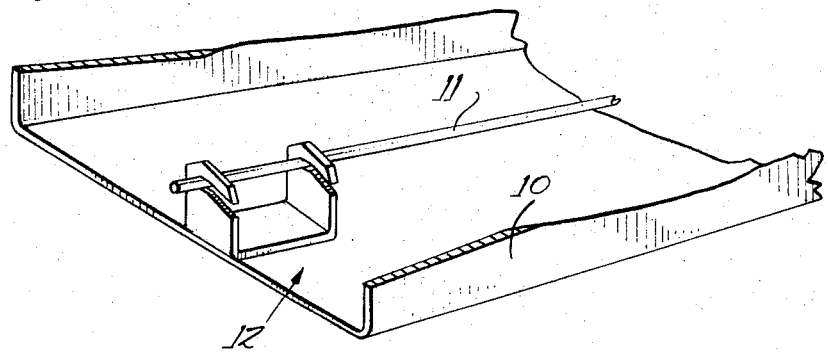
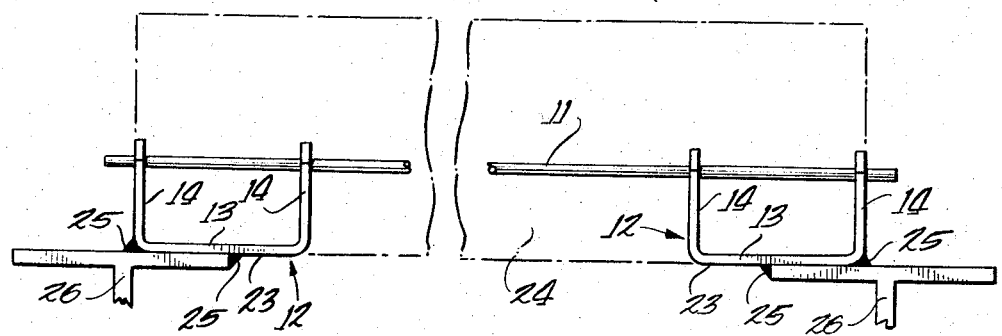
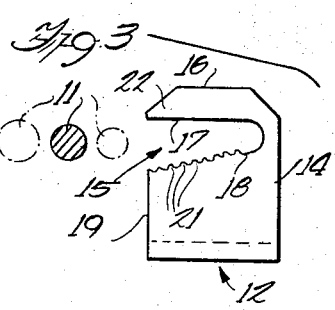
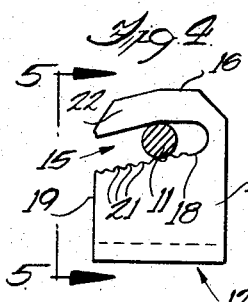
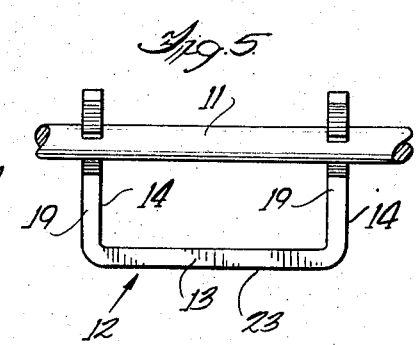
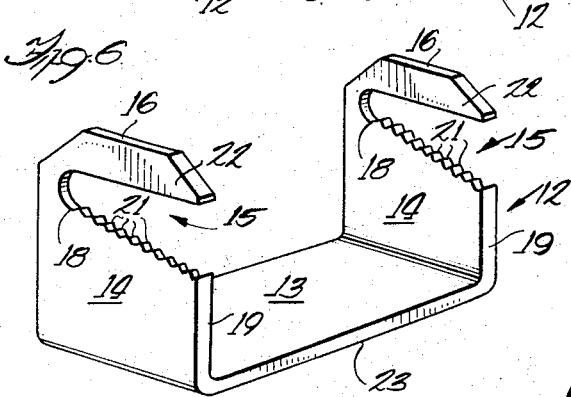
Inventor
Melvin H. Beckman
By Wilson & Geppert
Attorneys ३,३६०,८९८
Patented Jan. 2, 1968

3,360,898
CONCRETE WELD PLATE
Melvin H. Beckman, Rockford, Ill., assignor to National
Lock Co., Rockford, Ill., a corporation of Delaware
Filed Nov. 8, 1965, Ser. No. 506,772
2 Claims. (Cl. 52—684)

ABSTRACT OF THE DISCLOSURE

A concrete weld plate that is mounted on a reinforcement rod in a concrete form with a portion of the weld plate contacting the form so as to be exposed in the surface of the formed concrete member for welding to structural members in a building or other structure. The weld plate is generally U-shaped having a flat base and a pair of generally parallel arms, each having an aligned open-ended slot which outwardly diverges and is formed with at least one surface of serrations. The diverging slots will accommodate various sizes of reinforcement rods or members and the jaws formed by the slots may be clinched onto the reinforcement members to lock the weld plate onto the member.

---

The present invention relates to a concrete weld plate and more particularly to a one-piece weld plate that is mounted on a reinforcing rod or member in a precast concrete member and provides an exposed surface for welding the precast member to structural members in a building or structure to provide structural stability and/or attachment purposes.

The present system of providing welding surfaces in various types of precast post or pretensioned concrete units is to use several pieces of weldable steel and assemble them by welding and then placing these assemblies in the precast concrete forms. Because of variations from one precast form to another, these weld assemblies have to be wired or tack-welded to the reinforcement members in order to maintain them in the proper location when the concrete is poured into the form and also maintain their position during the vibration of the form to properly settle the concrete. The present invention obviates these difficulties by providing a single functionally designed weld plate which eliminates the need for assembled units or for wiring or tack-welding.

An important object of the present invention is the provision of a one-piece weld plate which is generally U-shaped with the arms or legs having open-ended slots with serrated surfaces to receive and retain the weld plate upon a reinforcement rod or member.

Another object of the present invention is the provision of a weld plate in which the open-ended slots form clamping jaws to retain the weld plate in position on the reinforcing rod or member. The walls of the open slots slightly diverge so as to accommodate a variety of sizes of reinforcing members, and the weld plate is easily attached thereto by slipping the plate onto the member from one side and lightly tapping the plate into position. The serrations in the slots provide positive engagement with the rods or members to prevent the weld plate from shifting when the concrete form is vibrated as the concrete is poured in.

A further object of the present invention is the provision of a weld plate frictionally retained or anchored onto a reinforcing member such as a rod where a more positive resistance to loosening during vibration is obtained by striking the top of the arm and clinching the weld plate to the rod. This clinching action locks the reinforcement rod onto the weld plate and the connection is made without disturbing the metallurgical structure of the reinforcement rods and/or without the use of wiring or other devices. By placing the weld plate in the manner described, it will bear firmly against the precast concrete form and provide a welding area in the desired location.

In the drawing:
FIGURE 1 is a partial perspective view of a precast concrete form showing a reinforcement rod with the novel weld plate of the present invention secured thereto.
FIG. 2 is a side elevational view showing two weld plates spaced on a reinforcing rod in a concrete slab and welded to supporting structural members.
FIG. 3 is an end elevational view of the weld plate showing a reinforcing rod prior to assembly therewith.
FIG. 4 is an end elevational view of the weld plate placed on the reinforcing rod and clinched thereto.
FIG. 5 is a side or front elevational view of the weld plate and reinforcing rod taken on the line 5—5 of FIG. 4.
FIG. 6 is an enlarged perspective view of the weld plate and showing the serrations on the sloping surface of the open-ended slots.

Referring more particularly to the disclosure in the drawing wherein is shown an illustrative embodiment of the present invention, FIG. 1 discloses a form 10 utilized for the casting of post or pre-tensioned concrete members, the form having one or more reinforcement members 11, such as rods or bars, extending therethrough and one or more of the novel U-shaped weld plates 12 mounted on a reinforcement member 11 and resting upon the bottom or base of the form.

Each weld plate 12 includes a base 13 having an upwardly extending arm 14 at each end, the arms 14 being parallel. Each arm 14 has an open-ended slot 15 adjacent the top 16 of the arm; the slot having a generally horizontal top edge 17, as shown in FIG. 3, and a downwardly sloping lower edge 18 so that the edges converge from the edge 19 of the arm 14. The lower sloping edge 18 of each slot 15 is provided with a plurality of serrations 21 to aid in retaining the weld plate 12 on the reinforcement member 11. As clearly seen in FIG. 6, the slots 15 are aligned with both slots opening on the same side of the weld plate.

As shown in FIGS. 1, 3 and 4, the weld plate 12 is slipped onto the reinforcement member 11 by moving the slots 15 over the member and lightly tapping so that the serrations or friction points 21 will maintain the weld plate in operative position. The arms 14 of the weld plate are of such dimensions that the base 13 of the weld plate contacts the lower surface or bottom of the form 10. To further hold the weld plate 12 in position, the jaws 22 formed by the slots 15 are tapped down or clinched over the reinforcement member 11 as shown in FIG. 4 to provide a positive retention or connection between the reinforcement member 11 and the weld plate 12 without disturbing the metallurgical structure of the reinforcement member by welding and without the use of wiring attachment.

The concrete is poured into the form 10 and the form is vibrated, but the weld plate 12 does not shift on the member 11 during vibration due to the positive connection. When the concrete has set and the form 10 is removed, the lower surface 23 of the base 13 of the weld plate 12 will be exposed in the lower surface of the concrete member 24. As seen in FIG. 2, the surface 23 provides a welding surface for the welds 25 to secure the plates 12 to structural members 26.

The particular dimensions of the weld plate will depend upon the structural requirements imposed upon it; these requirements also determining the location or placement of the weld plates in the form.

Having thus disclosed my invention, I claim:

1. A weld plate for utilization in a concrete form having reinforcement members therein to provide an exposed welding surface in the formed concrete structure, comprising a generally U-shaped metal plate having a continuous flat base adapted to abut the concrete form to provide an exposed welding surface and an upwardly extending arm at each end of the base, the arms being parallel and each having an open-ended transverse slot therein to receive a reinforcement member and position the flat base seated on the lower surface of the concrete form, said slots forming outwardly diverging jaws with the upper jaw having a generally horizontal surface parallel to the base and the lower jaw having a surface inclined upwardly from said base, at least one of said surfaces provided with serrations to frictionally grip the reinforcement member.

2. A weld plate as set forth in claim 1, in which the spacing of the surfaces of the jaws accommodates a variety of sizes of reinforcement members, said upper jaws being clinched over the reinforcement member to provide a positive interlock between the weld plate and the reinforcement member.

References Cited

UNITED STATES PATENTS

| | | | |
|---|---|---|---|
| 551,032 | 12/1895 | Hemphill | 248—68 |
| 871,210 | 11/1907 | Cummings | 52—686 |
| 977,704 | 12/1910 | Brownlee | 52—687 |
| 1,155,411 | 10/1915 | Flannery | 52—687 |
| 1,409,645 | 3/1922 | Baker | 52—684 |
| 1,495,659 | 5/1924 | Williamson | 52—677 |
| 2,034,726 | 3/1936 | Menninger | 52—686 |

FRANCIS K. ZUGEL, *Primary Examiner.*